(12) United States Patent
Hsu

(10) Patent No.: US 6,760,979 B1
(45) Date of Patent: Jul. 13, 2004

(54) STOP BLOCK DEVICE OF MEASURING TAPE

(76) Inventor: Cheng-Hui Hsu, No.126, Pao Chung Road, Hsin Tien City, Taipei (TW)

( * ) Notice: Subject to any disclaimer, the term of this patent is extended or adjusted under 35 U.S.C. 154(b) by 0 days.

(21) Appl. No.: 10/328,374

(22) Filed: Dec. 24, 2002

(51) Int. Cl.[7] .................................................. G01B 3/10
(52) U.S. Cl. ..................................... 33/767; 242/381.3
(58) Field of Search .......................... 33/767, 755, 761, 33/769; 242/381.3, 381.6

(56) References Cited

U.S. PATENT DOCUMENTS

| | | | | |
|---|---|---|---|---|
| 4,293,058 A | * | 10/1981 | Burton | ....................... 188/65.1 |
| 4,474,340 A | * | 10/1984 | Duda | ....................... 242/396.5 |
| 5,806,202 A | * | 9/1998 | Blackman et al. | ............ 33/767 |
| 6,026,585 A | * | 2/2000 | Li | ............................... 33/767 |
| 6,272,764 B1 | * | 8/2001 | Lin | ............................. 33/767 |
| 6,463,670 B1 | * | 10/2002 | Usami | ......................... 33/767 |
| 6,536,698 B2 | * | 3/2003 | Hsu | ......................... 242/381.3 |

* cited by examiner

Primary Examiner—Christopher W. Fulton
Assistant Examiner—R. Alexander Smith
(74) Attorney, Agent, or Firm—Rosenberg, Klein & Lee

(57) ABSTRACT

A stop block device of a measuring tape includes a stop block button with an improved structure that displaces a latch bracket having stop block surfaces to press down on the measuring tape.

1 Claim, 5 Drawing Sheets

STOP BLOCK DEVICE OF MEASURING TAPE

BACKGROUND OF THE INVENTION

1. Field of the Invention

The present invention relates to a stop block device of a measuring tape, more particularly to a measuring tape capable of retracting the tape and increasing the buffer of stopping and blocking effect to prevent the shear force produced by excessive retracting speed. An improved structure of a stop block button constitutes a stop block effect by pressing down the button to improve the life of the measuring tape and the safety to user.

2. Description of the Prior Art

In general, a traditional measuring tape usually has an internal tape wheel having a concentric spiral flexible bracket coiled at the center of the wheel and a ruler coiled around the exterior of the wheel. A flange is disposed at the front end of the ruler, and the central section of the flexible bracket of the tape wheel sleeves through the central axle on the left external casing. A buffering stop block is disposed at the front end of the ruler, and latched into the front end of the bottom of the left external casing, and the other side of the buffering stop block is latched into the front end of the bottom of the right external casing. The right external casing has screws installed into the screw hole for securing the central axle at the left external casing and fixed onto a pillar to constitute a measuring tape. The operation of the traditional product is to pull the ruler of the measuring tape to an appropriate length for measurement. After the measurement is completed, the front end of the measuring tape is released and the ruler of the measuring tape will be retracted since the measuring tape has a coiled flexible bracket (with an action similar to the winding) and gives a powerful automatic retracting function. The longer the ruler is pulled, the faster is the retracting speed. If the measuring tape is made of metal plate, then it may cut the user's hand very easily. It definitely cause inconvenience for its use. Furthermore, if the retracting speed is too fast, the end of the ruler will impact on the buffering member with a large force. In general, the structure of the conventional buffering member usually does not have a good buffering effect, and thus cause the front end of the measuring tape to fall off, and makes the measuring tape unusable.

To make the measuring tape more convenient to use and practical, the inventor of the present invention with many years in the related field performing a series of researches and developments to enhance the stop block device of the measuring tape, and finally succeeds to invent the present invention.

SUMMARY OF THE INVENTION

The primary objective of the present invention is to provide a stop block device of a measuring tape, and such stop block device has a button for pressing downward to constitute a stopping and blocking effect in order to enhance the buffering effect and reducing the impact of the retracting ruler, and improve the safety and life of the measuring tape.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
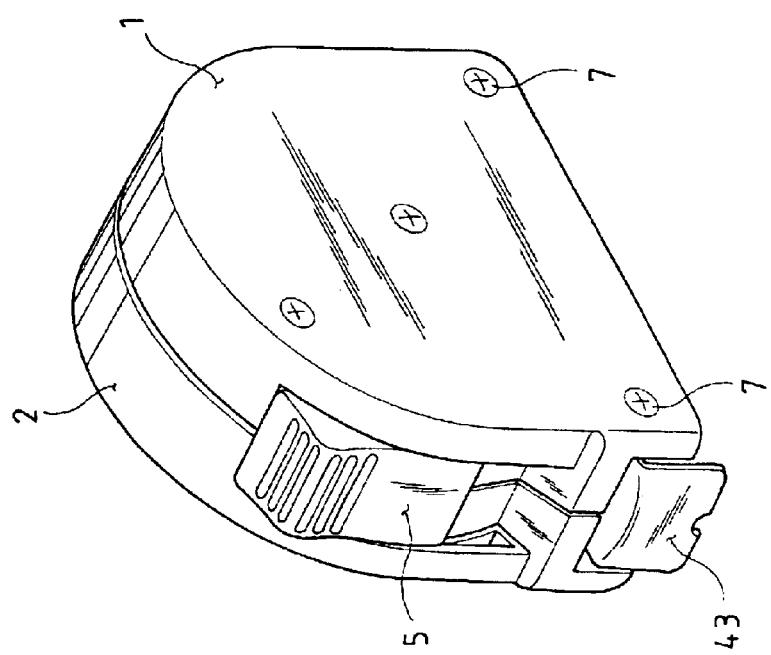
FIG. 1 is an illustrative diagram of the assembled structure of the present invention.

In this detailed description of the preferred embodiments, it should be noted that like elements are indicated by the same reference numerals throughout the disclosure.

Figure 2:
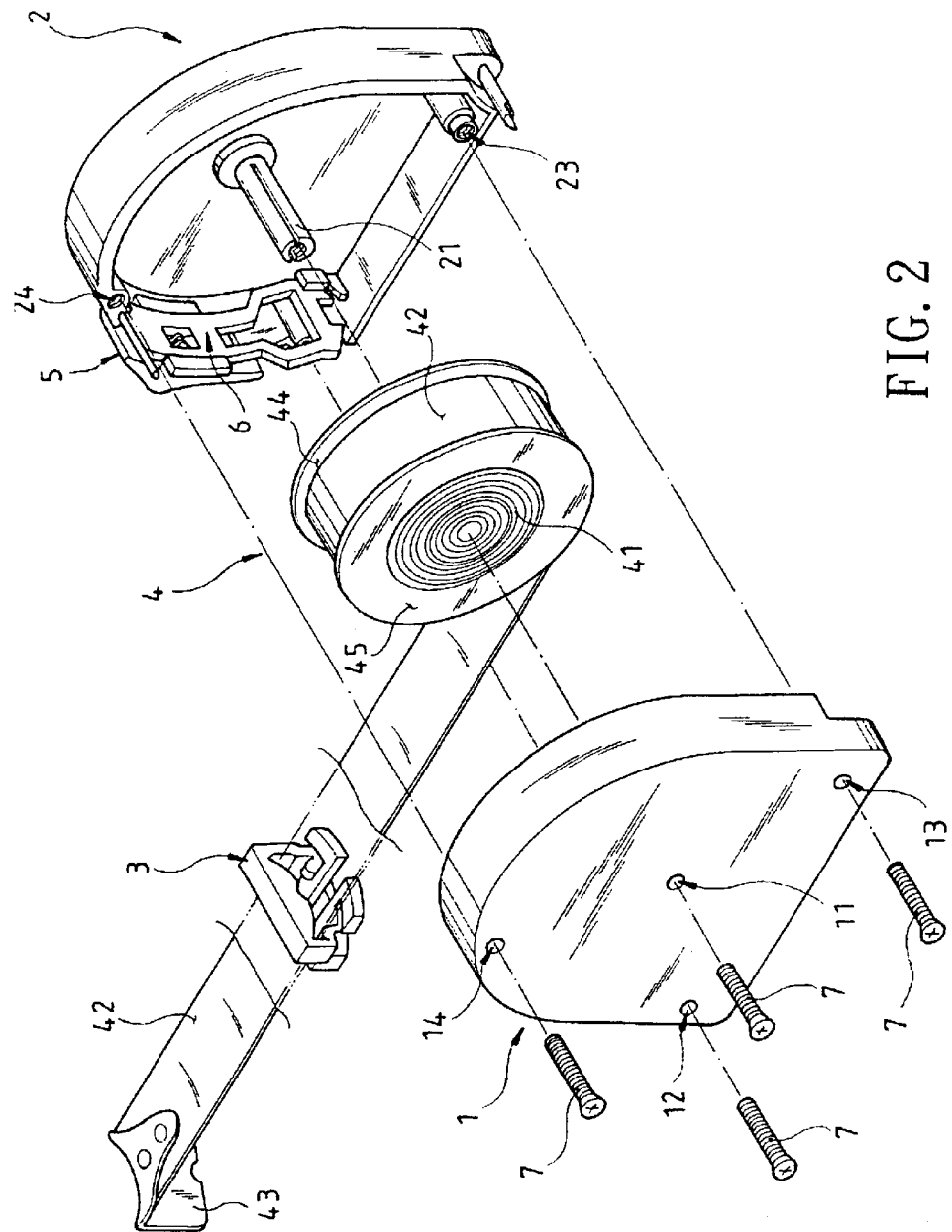
FIG. 2 is an illustrative diagram of the disassembled parts of the structure of the present invention.
Figure 3:
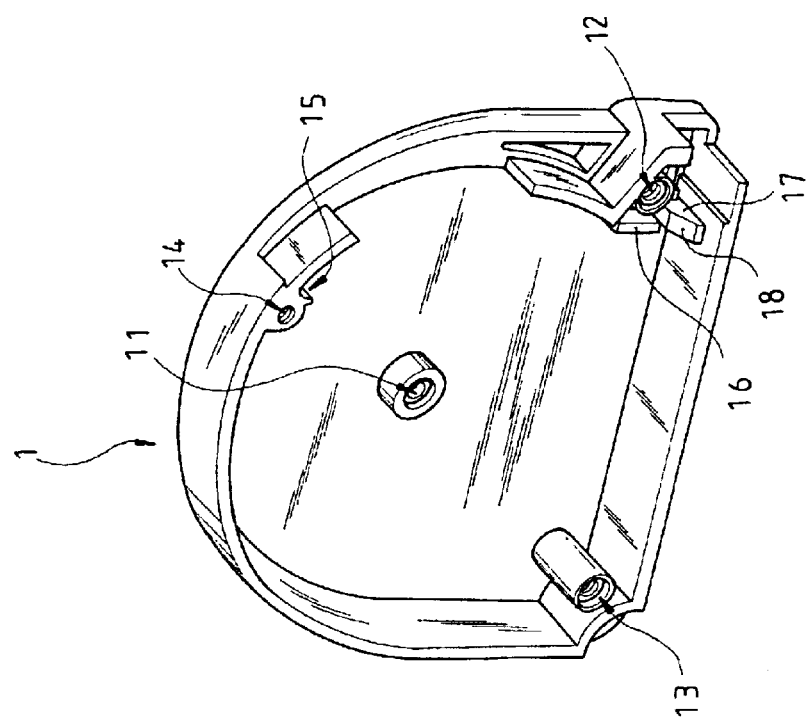
FIG. 3 is an illustrative diagram of the right external casing structure of the present invention.
Figure 4:
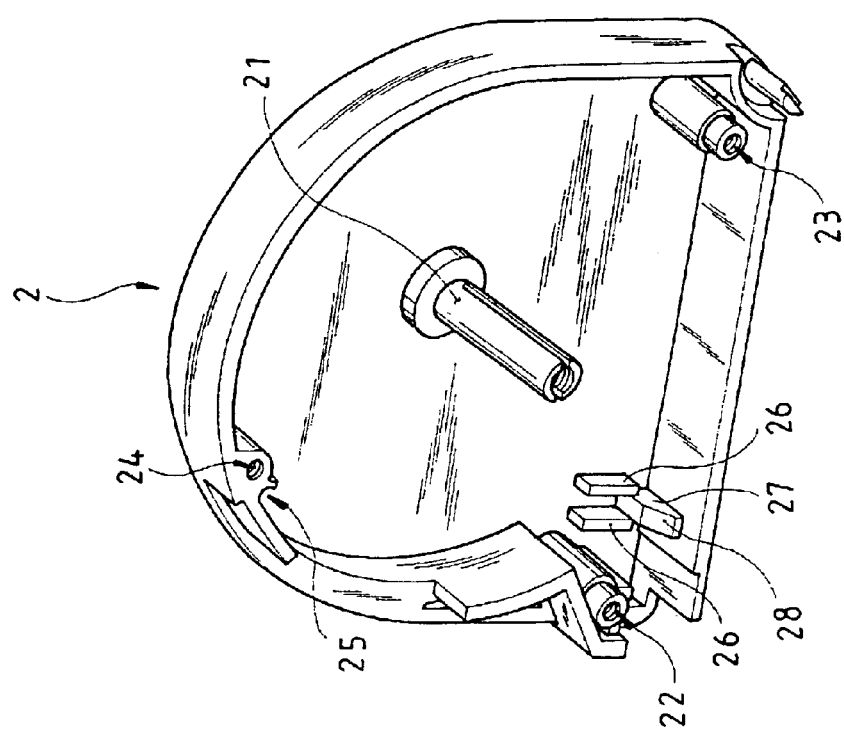
FIG. 4 is an illustrative diagram of the left external casing structure of the present invention.
Figure 7:
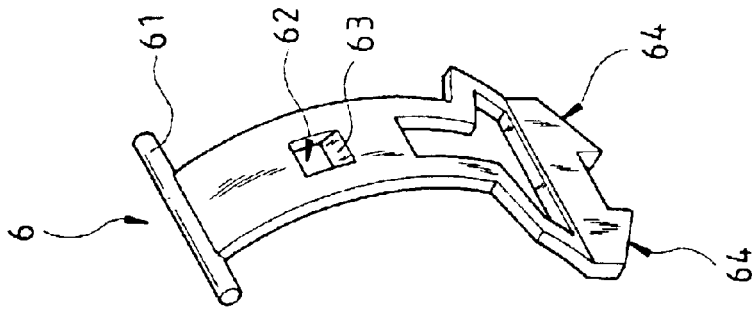
FIG. 7 is an illustrative diagram of the latch bracket structure of the present invention.
Figure 6:
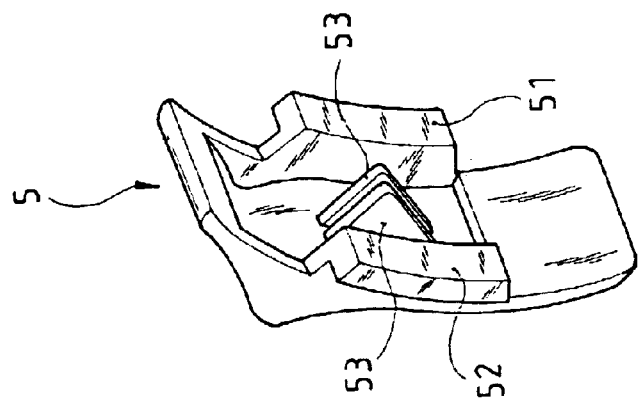
FIG. 5 and FIG. 6 are illustrative diagrams of the stop block button structure of the present invention.
Figure 5:
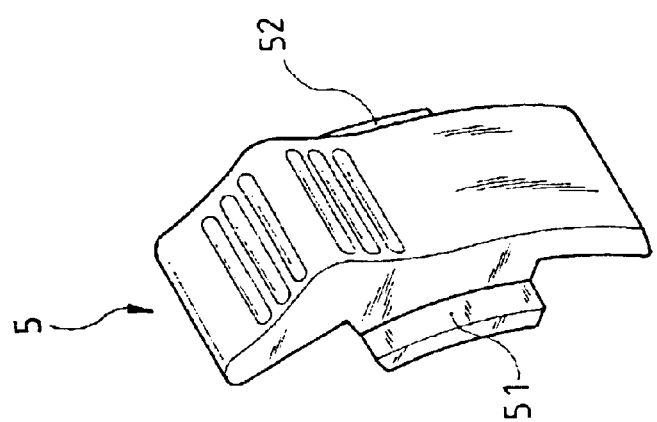

Please refer to FIG. 1 to FIG. 7. The stop block device of a measuring tape of the present invention comprises a right external casing 1, a left external casing 2, a buffering member 3, a wheel 4, a stop block button 5, and a latch bracket 6.

The right external casing 1 is integrally made of a plastic material. A central screw hole 11 is disposed at the center of the inner layer of the right external casing 1. A screw hole 12 is located at the front end of the lower edge of the inner layer, a tubular screw hole 13 is disposed at a rear end of the lower edge of the inner layer, and a screw hole 14 is disposed at the upper edge of the inner layer. The lower edge of the screw hole 14 has a circular latching axle hole 15 adjacent thereto, and the front end of the lower edge of the inner layer has two rectangular latch brackets 16 (only one latch bracket 16 is fully visible in the drawing Figures). A stop block 17 is disposed between the latch brackets 16, adjacent the lower ends thereof. The stop block has a slanted surface 18 on its external side. The left external casing 2 is integrally made of a plastic material. A central axle 21 protrudes from the center of the inner layer of the left external casing 2. A fixed screw pillar 22 protrudes at the front end of the lower edge of the inner layer. A fixed screw pillar 23 is disposed at the rear end of the lower edge of the inner layer. Furthermore, a fixed screw hole 24 is disposed at the upper edge of the inner layer of the left external casing. The lower edge of the screw hole 24 has a circular latching axle hole 25 adjacent thereto, and the front end of the lower edge of the inner layer has two rectangular latch brackets 26. A stop block 27 is disposed between the latch brackets 26, adjacent the lower ends of latch brackets 26. The stop block 27 has a slanted surface 28 on its external side.

The wheel 4 has a centrally located concentric spiral flexible plate 41. The wheel 4 has a ruler 42 coiled, a ruler head 23 is riveted to the front end of the ruler 42, and each side of the wheel 4 has a respective wheel guard 44, 45 thereon.

The stop block button 5 is integrally made of a plastic material. The stop button 5 has a latch wing 51, 52 on each side of its middle section and two triangular stop block cones 53 protruding from the inner side of the stop block button 5.

The latch bracket 6 is integrally made of a plastic material. The latch bracket 6 has a fixed axle rod 61 transversally disposed thereon, and a hollow latch groove 62 disposed at the middle section of the latch bracket 6. The latch groove 62 has a slanted surface 63 at a bottom portion thereof. Furthermore, both sides of the bottom of the latch bracket 6 have a downwardly slanted stop and block surface 64.

The central section of the flexible plate 41 of the wheel 4 is sleeved onto the axle 21 of the left external casing 2. A buffering member 3 is latched to the front end of the bottom of the left external casing 2 with the ruler 42 extending therethrough. The fixing axle rod 61, located at the top of the latch bracket 6, is latched into the latch axle hole 25 of the left external casing 2. A bottom side of the latch bracket 6 has a stop block surface 64 disposed between the two rectangular latch plates 26 at the front end of the inner layer of the left external casing 2. The latch wing 51, at the middle section of the stop block button 5, is latched to the front edge of the inner layer of the left external casing 2. The stop block cone 53, at the center of the inner side of the stop block button 5, passes into the latch groove 62 at the middle section of the latch bracket 6.

Another side of the buffering member 3 is latched to the front end of the bottom of the right external casing 1. The other end of the fixed axle rod 61 is coupled into the latch axle hole 15 of the right external casing 1. The stop block surface 64 on the other bottom side of the latch bracket 6 passes between the two rectangular latch plates 16 at the front end of the lower edge of the inner layer of the right external casing 1. The latch wing 52, on the other side at the middle section of the stop block button 5, engages the front edge of the inner layer of the right external casing.

A plurality of screws 7 respectively pass through the central screw hole 11 and screw holes 12, 13, 14 to secure the central axle of the left external casing 2 and the fixed screw pillars 22, 23 and fixed screw hole 25, to construct an integral measuring tape.

In the measuring tape assembly of the present invention, the ruler 42 is pulled out to an appropriate length for use. When the ruler of the measuring tape needs to be fixed at a position, the stop block button 5 can be pressed down. When the stop block button 5 is pressed down, it forces the latch bracket 6 to be displaced downwardly, so that the mutual clipping relation of the stop block surface 64 on both sides of the bottom of the latch bracket 6 and the slanted surfaces 18, 28 gives the effect of fixing the ruler 42 and stopping retraction of the ruler 42.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A stop block device of a measuring tape, said measuring tape comprising of a right external casing, a left external casing, a buffering member, a wheel, a stop block button, and a latch bracket; wherein:

the right external casing is integrally made of a plastic material and has (a) a central screw hole disposed at a center of a first inner layer of the right external casing, (b) a first screw hole at a front end of a lower edge of the first inner layer, (c) a tubular screw hole at a rear end of the lower edge of the first inner layer, and (d) a second screw hole at an upper edge of the first inner layer of the right external casing, said second screw hole having a circular first latch axle hole formed adjacent thereto in said first inner layer, said right external casing having two rectangular first latch plates disposed at the front end of the lower edge of the first inner layer, and a first stop block disposed between said first latch plates adjacent lower ends thereof, said first stop block having an outer side with a slanted surface;

the left external casing is integrally made of a plastic material and has (a) a central axle protruded from a center of a second inner layer of the left external casing, (b) a first fixed screw pillar protruded from a front end of a lower edge of the second inner layer, (c) a second fixed screw pillar protruded from a rear end of the lower edge of the second inner layer, and (d) a fixed screw hole at an upper edge of the second inner layer, the fixed screw hole having a circular second latch axle hole formed adjacent thereto in said second inner layer, said left external casing having two rectangular second latch plates disposed at the front end of the lower edge of said second inner layer, and a second stop block disposed between said second latch plates adjacent lower ends thereof, said second stop block having an an external side with a slanted surface;

the wheel having a concentric spiral flexible plate coiled at a central portion thereof, a wheel guard on each side of said wheel, and a ruler coiled around an exterior of said wheel, said ruler having a ruler head coupled to a front end thereof;

the stop block button being integrally made of a plastic material and having a pair of latch wings respectively disposed on opposing sides of a middle section thereof, the stop block button having two triangular stop block cones extending from a center portion of an inner side thereof;

the latch bracket being integrally made of a plastic material and having (a) a fixed axle rod transversally disposed at a top portion thereof, (b) a hollow latch groove formed in a middle section of said latch bracket, the latch groove having a slanted surface at a bottom edge thereof, and (c) a pair of stop block surfaces respectively slanting downwardly on a bottom of two sides of said latch bracket;

a central section of the flexible plate of the wheel being sleeved to the central axle of the left external casing, and the buffering member has one side latched to a front end of a bottom of the left external casing with said ruler extending through said buffering member, an end of the fixed axle rod of the latch bracket being coupled to the second latch axle hole of the left external casing, one of the stop block surfaces of the latch bracket being disposed between said second latch plates, one of said latch wings being engaged with a front edge of said second inner layer, the buffering member having another side thereof latched to a front end of a bottom of the right external casing, an opposing end of the fixed axle rod of the latch bracket being coupled to the first latch axle hole of the right external casing, another of the stop block surfaces of the latch bracket being disposed between said first latch plates another of said latch wings being engaged with a front edge of the first inner layer of the right external casing; and, a plurality of screws separately passing through the central screw hole and said first, second and tubular screw holes of said right external casing for engaging a corresponding one of the central axle, said first and second fixed screw pillars, and said fixed screw hole of the left external casing to construct a measuring tape.

* * * * *